(12) United States Patent  (10) Patent No.: US 11,681,623 B1
Wang et al.  (45) Date of Patent: Jun. 20, 2023

(54) PRE-READ DATA CACHING METHOD AND APPARATUS, DEVICE, AND STORAGE MEDIUM (71) Applicant: GUANGDONG INSPUR SMART COMPUTING TECHNOLOGY CO., LTD., Guangdong (CN)

(72) Inventors: Shuaiyang Wang, Guangdong (CN); Wenpeng Li, Guangdong (CN); Duan Zhang, Guangdong (CN)

(73) Assignee: GUANGDONG INSPUR SMART COMPUTING TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/927,822

(22) PCT Filed: Jan. 23, 2021

(86) PCT No.: PCT/CN2021/073442
§ 371 (c)(1),
(2) Date: Nov. 25, 2022

(87) PCT Pub. No.: WO2021/238260
PCT Pub. Date: Dec. 2, 2021

(30) Foreign Application Priority Data

May 29, 2020 (CN) .......................... 202010479026.4

(51) Int. Cl.
G06F 12/0811 (2016.01)
(52) U.S. Cl.
CPC .. *G06F 12/0811* (2013.01); *G06F 2212/1024* (2013.01)

(58) Field of Classification Search
CPC .................. G06F 12/0811; G06F 2212/1024
See application file for complete search history.

(56) References Cited

U.S. PATENT DOCUMENTS

| 5,983,324 | A | 11/1999 | Ukai et al. |
| 2008/0126602 | A1 | 5/2008 | Biran et al. |
| 2014/0122809 | A1* | 5/2014 | Robertson ........... G06F 12/0804 |
| | | | 711/E12.017 |

FOREIGN PATENT DOCUMENTS

| CN | 102447610 | A | 5/2012 |
| CN | 105468305 | A | 4/2016 |
| CN | 106164875 | A | 11/2016 |
| CN | 109478165 | A | 3/2019 |
| CN | 109947720 | A | 6/2019 |
| CN | 111723058 | A | 9/2020 |

OTHER PUBLICATIONS

PCT/CN2021/073442 international search report.

* cited by examiner

*Primary Examiner* — Jae U Yu
(74) *Attorney, Agent, or Firm* — IPro, PLLC (57) ABSTRACT A pre-read data caching method and apparatus, a device, and a storage medium, the method including: receiving a read command for a target file; if determining that there is target pre-read data of the target file in a pre-read queue, then moving the pre-read data from the pre-read queue into a secondary cache queue; reading the target pre-read data in the secondary cache queue; and, after reading is complete, moving the target pre-read data from the secondary cache queue into a reset queue, the invalidation priority level of the pre-read queue being the lowest.

20 Claims, 3 Drawing Sheets

PRE-READ DATA CACHING METHOD AND APPARATUS, DEVICE, AND STORAGE MEDIUM

CROSS-REFERENCE TO RELATED APPLICATIONS

The present application claims priority to the Chinese patent application No. 202010479026.4 entitled "Pre-Read Data Caching Method and Apparatus, Device, and Storage Medium" filed on May 29, 2020, to the China National Intellectual Property Administration, the entire contents of which are incorporated herein by reference.

FIELD

The present application relates to the technical field of computer applications, and in particular to a pre-read data caching method and apparatus, a device, and a storage medium.

BACKGROUND

With the rapid development of computer technology, a storage system is gradually developed, and its application in various industries is more and more widespread. The storage system has the advantage that a large number of files can be stored. But at the same time, there is a problem that the file reading load is slow. When reading a file in a storage system, it is necessary to find a storage server where the file to be read is located, and then acquire the corresponding data from the storage server. On the condition that the corresponding data acquisition is performed only when there is an actual file read request, the data loading may be slow and the reading delay may be long due to the influence of bandwidth and disk performance, and so on.

In response to this situation, the problem of slow data loading and long reading delay is usually solved by pre-reading files. After a pre-read operation is performed on a file, the pre-read data is loaded into internal storage such that when the file is subsequently read or written, etc., the data loading speed will be improved and the reading delay will be reduced.

In the related art, pre-read data, writing completed data, and read data share one cache queue, and data in the entire cache queue is aged according to popularity. Processing in this manner results in pre-read data that are temporarily not accessed are aged first. However, in practice, the possibility that the pre-read data is accessed again later is often higher than that of the data written or read. On the condition that the pre-read data is always aged first, the pre-read data will not be used when there is a corresponding file reading requirement such that the data loading speed becomes slow and the reading delay becomes long, thereby affecting the system performance.

SUMMARY

The object of the present application is to provide a pre-read data caching method and apparatus, a device, and a storage medium so as to conveniently protect the validity of the pre-read data and improve the system performance.

In order to solve the above technical problem, the present application provides the following technical solutions:

a pre-read data caching method, including:
receiving a read command for a target file;
on the condition that determining that there are target pre-read data of the target file in a pre-read queue, moving the pre-read data from the pre-read queue into a secondary cache queue;
reading the target pre-read data in the secondary cache queue; and
after reading is complete, moving the target pre-read data from the secondary cache queue into a reset queue;
wherein an invalidation priority level of the pre-read queue is the lowest.

In an embodiment of the present application, after receiving a read command for a target file, the method further includes:
in the case where the reading is not completed, moving the target pre-read data in the pre-read queue and/or the secondary cache queue into the reset queue on the condition that it is monitored that the target file is closed.

In an embodiment of the present application, after moving the target pre-read data from the secondary cache queue into a reset queue, the method further includes:
in the case where the target pre-read data is read and a write operation is to be performed on the target pre-read data, moving the target pre-read data from the reset queue into a write queue.

In an embodiment of the present application, the method further includes:
in a case where it is monitored that used cache space exceeds a set space threshold value, aging data in the reset queue, the secondary cache queue, and the pre-read queue according to a preset invalidation priority level sequence.

In an embodiment of the present application, the invalidation priority level sequence from high to low is successively: the reset queue, the secondary cache queue, and the pre-read queue.

In an embodiment of the present application, aging data in the reset queue, the secondary cache queue, and the pre-read queue according to a preset invalidation priority level sequence includes:
aging each of the data in the reset queue in turn;
in the process of aging the data in the reset queue, on the condition that the used cache space is less than or equal to the space threshold value, stopping the aging operation;
otherwise, after aging all the data in the reset queue, aging each of the data in the secondary cache queue in turn;
in a process of aging the data in the secondary cache queue, on the condition that the used cache space is less than or equal to the space threshold value, stopping the aging operation;
otherwise, after aging all the data in the secondary cache queue, aging each of the data in the pre-read queue in turn;
and in a process of aging the data in the pre-read queue, on the condition that the used cache space is less than or equal to the cache threshold value, stopping the aging operation.

In an embodiment of the present application, aging each of the data in the reset queue in turn includes:
aging each of the data in the reset queue in turn according to a popularity sequence from low to high;
and/or,
aging each of the data in the secondary cache queue in turn includes:
aging each of the data in the secondary cache queue in turn according to a sequence of a storage duration from long to short;
and/or,
aging each of the data in the pre-read queue in turn includes:

aging each of the data in the pre-read queue in turn according to the popularity sequence from low to high.

A pre-read data caching apparatus, including:

a read command receiving module, configured for receiving a read command for a target file;

a data shift-in first module configured for, on the condition that it is determined that there are target pre-read data of the target file in a pre-read queue, moving the target pre-read data from the pre-read queue into a secondary cache queue;

a data read module configured for reading the target pre-read data in the secondary cache queue;

and a data shift-in second module configured for, after reading is completed, moving the target pre-read data from the secondary cache queue into a reset queue;

wherein an invalidation priority level of the pre-read queue is the lowest.

A pre-read data caching device, including:

a memory for storing a computer program;

and a processor for implementing the steps of the above-mentioned pre-read data caching method according to any of the above when executing the computer program.

A computer-readable storage medium having stored a computer program thereon, when the computer program executed by a processor, implementing steps of the pre-read data caching method according to any of the above.

With the application of the technical solutions provided by an embodiment of the present application, after receiving a read command for a target file, on the condition that determining that there are target pre-read data of the target file in a pre-read queue, the pre-read data is moved from the pre-read queue into a secondary cache queue; the target pre-read data is read in the secondary cache queue; after reading is completed, the target pre-read data is moved from the secondary cache queue into a reset queue, the invalidation priority level of the pre-read queue being the lowest. According to the degree that the data may be read, a multi-level cache is set to protect the validity of the pre-read data, which may improve the overall pre-read efficiency and read performance.

BRIEF DESCRIPTION OF THE DRAWINGS

In order to explain the embodiments of the present application or the technical solutions in the prior art more clearly, a brief description will be given below with reference to the accompanying drawings which are used in the description of the embodiments or the prior art; obviously, the drawings in the description below are merely some embodiments of the present application, and for those of ordinary skills in the art, other drawings can also be obtained from these drawings without creative efforts.

DETAILED DESCRIPTION OF THE EMBODIMENTS

In order to enable those skilled in the art to better understand the solutions of the present application, the present application is further described in detail below in combination with the accompanying drawings and preferred embodiments. Obviously, the described embodiments are only part of rather than all of the embodiments of the present application. Based on the embodiments in the present application, all other embodiments obtained by a person of ordinary skills in the art without inventive efforts fall within the scope of the present application.

Figure 1:
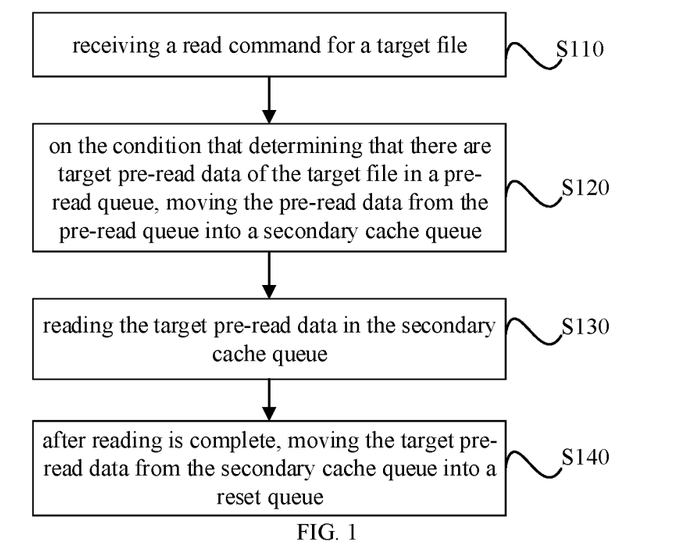
FIG. 1 is a flow chart for implementing a pre-read data caching method in an embodiment of the present application.

With reference to FIG. 1, a flow chart for implementing a pre-read data caching method provided in an embodiment of the present application is shown. The method may include the following steps.

S110, receiving a read command for a target file.

A large number of files may be stored in a storage system. A user or other systems may send a file read request to the storage system when there is a file read request.

In practical applications, whether a target file is a file to be pre-read may be determined according to read 10. On the condition that the target file is the file to be pre-read, the target file may be pre-read to obtain target pre-read data of the target file. The target file is any file in the storage system. After the target pre-read data is obtained, the target pre-read data may be stored in a pre-read queue. Multiple pre-read data may be stored in the pre-read queue. The pre-read queue may be denoted as a readahead queue.

Upon receiving a read command for the target file, the pre-read queue in the internal storage may be viewed to determine whether the target pre-read data of the target file exist in the pre-read queue. On the condition that the target pre-read data exist, the operation of step S120 may be continued. On the condition that the target pre-read data do not exist, it indicates that the target file may not be previously pre-read, or that the target pre-read data of the target file are aged. In the case where it is determined that the target pre-read data of the target file do not exist in the pre-read queue, the target pre-read data may not be used. It is necessary to look up the relevant data of the target file in the storage server of the storage system and read the same.

S120, on the condition that determining that there are target pre-read data of the target file in a pre-read queue, moving the pre-read data from the pre-read queue into a secondary cache queue.

Upon receiving a read command for the target file, and determining that the target pre-read data of the target file exists in the pre-read queue, it indicates that a pre-read operation is previously performed on the target file, in which case the target pre-read data may be moved from the pre-read queue into the secondary cache queue.

In an embodiment of the present application, the data stored in the pre-read queue are pre-read data obtained after pre-reading a file, and are not actually read. When a read service hits the pre-read queue, the corresponding data in the pre-read queue may be moved into the secondary cache queue. In this way, the pre-read data which are not actually read and the pre-read data which are to be read may be stored in different queues, respectively, and may be distinguished by different queues to facilitate data management.

In the secondary cache queue, no popularity update is performed each time a read is triggered, and the whole is aged according to time.

S130, reading the target pre-read data in the secondary cache queue.

After the target pre-read data is moved from the pre-read queue into the secondary cache queue, the target pre-read data may be read in the secondary cache queue.

S140, after reading is complete, moving the target pre-read data from the secondary cache queue into a reset queue.

An embodiment of the present application provides multiple queues for the storage of data at different stages. The target pre-read data is read in the secondary cache queue. On the condition that the read is completed, the target pre-read data may be moved from the secondary cache queue into the reset queue. The reset queue may be denoted as a reset queue.

The pre-read queue, the secondary cache queue, and the reset queue share a cache space. In the case where the used cache space exceeds a set space threshold value, data in the queue needs to be aged so as to release the cache space, reduce the used cache space, and increase the available cache space. The aging strategy on which different queues are based may be different. In an embodiment of the present application, the pre-read queue has the lowest invalidation priority level. Namely, in the case where the used cache space exceeds the space threshold value, aging processing is performed firstly on the data in the secondary cache queue and/or the reset queue; after aging processing is performed on all the data in the secondary cache queue and the reset queue, and on the condition that the used cache space has not yet reached the set requirement, aging processing is further performed on the data in the pre-read queue. Therefore, the validity of the pre-read data is protected and the overall pre-read efficiency and read performance are improved.

With the application of the method provided by an embodiment of the present application, after receiving a read command for a target file, on the condition that determining that there is target pre-read data of the target file in a pre-read queue, the pre-read data is moved from the pre-read queue into a secondary cache queue; the target pre-read data is read in the secondary cache queue; after reading is completed, the target pre-read data is moved from the secondary cache queue into a reset queue, the invalidation priority level of the pre-read queue being the lowest. According to the degree that the data may be read, a multi-level cache is set to protect the validity of the pre-read data, which may improve the overall pre-read efficiency and read performance.

In one embodiment of the present application, after receiving a read command for a target file in step S110, the method may further include the following steps.

In the case where the reading is not completed, the target pre-read data in the pre-read queue and/or the secondary cache queue are moved into the reset queue on the condition that it is monitored that the target file is closed.

In an embodiment of the present application, after receiving a read command for a target file, on the condition that it is determined that target pre-read data of the target file exists in the pre-read queue, the target pre-read data is moved from the pre-read queue into a secondary cache queue, and the target pre-read data is read in the secondary cache queue. Herein, the target file may be closed in each process such that the reading of the target pre-read data is in an incomplete state. In this case, the target pre-read data may still be stored in the pre-read queue or the secondary cache queue, or partially in the pre-read queue and partially in the secondary cache queue. The target pre-read data in the pre-read queue and/or the secondary cache queue may be moved into the reset queue.

In one embodiment of the present application, after moving the target pre-read data from the secondary cache queue into the reset queue in step S140, the method may further include the following steps.

In the case where the target pre-read data is read and a write operation is to be performed on the target pre-read data, the target pre-read data is moved from the reset queue into the write queue.

In an embodiment of the present application, the write operation of the target pre-read data may be performed according to actual needs. In the case where the target pre-read data is read and a write operation is to be performed on the target pre-read data, the target pre-read data may be moved from the reset queue into the write queue and a corresponding write operation is performed in the write queue, thereby avoiding that the target pre-read data is aged when the data in the reset queue is aged.

In one embodiment of the present application, the method may further include the following steps.

When it is monitored that the used cache space exceeds the set space threshold value, the data in the reset queue, the secondary cache queue, and the pre-read queue are aged according to the preset invalidation priority level sequence.

In an embodiment of the present application, an invalidation priority level sequence may be pre-set for several queues being set, wherein the invalidation priority level of the pre-read queue is the lowest.

At the same time, one space threshold value may be set. When the used cache space exceeds the space threshold value, it is considered that the data in the queue needs to be invalidated currently so as to release the cache space. The space threshold value may be set and adjusted according to the actual situation, such as being set to the same size as the total cache space, or being ninety percent of the total cache space.

The pre-read queue, the secondary cache queue, and the reset queue share a cache space. The stored data will occupy the cache space, and the used cache space is continuously reduced with the gradual increase of the stored data. The size of the used cache space may be monitored. When it is monitored that the used cache space exceeds the set space threshold value, the data in the reset queue, the secondary cache queue, and the pre-read queue may be aged according to the preset invalidation priority level sequence. Specifically, the aging processing may be performed by using the trim principle.

The pre-read queue has the lowest invalidation priority level. Specifically, the sequence of invalidation priority level from high to low may be successively as follows: the reset queue, the secondary cache queue, and the pre-read queue.

In an embodiment of the present application, each of the data in the reset queue may be aged in turn; in the process of aging the data in the reset queue, on the condition that the used cache space is less than or equal to the space threshold value, then stop the aging processing operation; otherwise, after aging all the data in the reset queue, age each of the data in the secondary cache queue in turn; in the process of aging the data in the secondary cache queue, on the condition that the used cache space is less than or equal to the space threshold value, then stop the aging processing operation; otherwise, after aging all the data in the secondary cache queue, age each of the data in the pre-read queue in turn; during the aging of the data in the pre-read queue, the aging processing is stopped on the condition that the used cache space is less than or equal to the cache threshold value.

On the condition that the sequence of invalidation priority level is successively: the reset queue, the secondary cache queue, and the pre-read queue, it indicates that the reset queue has the highest invalidation priority level, the secondary cache queue has the second highest invalidation priority level, and the pre-read queue has the lowest invalidation priority level.

First, aging processing is performed on each of the data in the reset queue in turn. Specifically, aging processing may be performed on each of the data in the reset queue in the sequence of the popularity from low to high so as to preferentially retain data with high popularity. During the aging processing, the cache space is continuously released and the used cache space is continuously updated.

In this process, on the condition that the used cache space is less than or equal to the space threshold value, it indicates that the currently updated used cache space is sufficient and the aging processing operation may be stopped.

Otherwise, after aging all data in the reset queue, each of the data in the secondary cache queue is aged in turn. Specifically, the aging processing may be performed on each of the data in the secondary cache queue in order of the storage duration from long to short. Data with short storage duration may be read or will be read with a high probability of being read. Priority should be given to data with short storage duration so as to improve reading efficiency. During the aging processing, the cache space is still continuously released and the used cache space is continuously updated.

In this process, on the condition that the used cache space is less than or equal to the space threshold value, it indicates that the currently updated used cache space is sufficient and the aging processing operation may be stopped.

Otherwise, after aging all of the data in the secondary cache queue, each of the data in the pre-read queue is aged in turn. Specifically, each of the data in the pre-read queue may be aged sequentially from low to high in popularity. So that data with high popularity is retained preferentially. During the aging processing, the cache space is still continuously released and the used cache space is continuously updated.

In this process, on the condition that the used cache space is less than or equal to the cache threshold value, the aging processing operation is stopped.

In practical applications, the popularity of the data may be determined according to the number of times the data is accessed, the distance between the accessed time and the current time, and so on.

Figure 2:
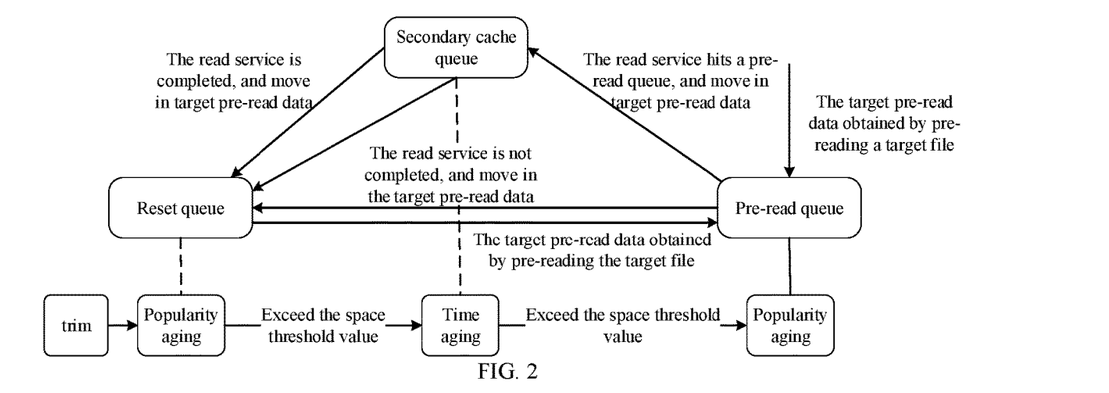
FIG. 2 is a schematic diagram of a specific process of a pre-read data cache in an embodiment of the present application.

FIG. 2 shows a schematic diagram of a specific implementation process of an embodiment of the present application.

When it is determined that the target file is to be pre-read, the target pre-read data obtained by pre-reading the target file is stored in the pre-read queue. Upon receiving a read command for the target file, on the condition that it is determined that target pre-read data for the target file exists in the pre-read queue, the target pre-read data is moved from the pre-read queue into the secondary cache queue. That is, when the read service hits the pre-read queue, the target pre-read data is moved into the secondary cache queue. When the read service finishes reading the target pre-read data in the secondary cache queue, the target pre-read data is moved into the reset queue. In the case where the reading is not completed, the target pre-read data in the pre-read queue and the secondary cache queue is moved into the reset queue on the condition that it is monitored that the target file is closed. When the used cache space exceeds the space threshold value, the trim principle is used to age the data in the queue. Firstly age the data in the reset queue according to the popularity aging strategy. On the condition that it still exceeds the space threshold value, then age the data in the secondary cache queue according to the time aging strategy. On the condition that it still exceeds the threshold value, finally, age the data in the pre-read queue according to the popularity aging strategy.

In addition, when it is determined that the target file is to be pre-read, on the condition that the target pre-read data for the target file is in the reset queue, the target pre-read data in the reset queue is moved into the pre-read queue.

The storage system applied in an embodiment of the present application may be specifically a distributed storage file system; with regard to the pre-read data, a three-level cache mechanism is set according to the degree to which the data may be read; the pre-read data which are not read are stored in a pre-read queue; the read pre-read data are stored in a secondary cache queue; the pre-read data whose read is completed are stored in the reset queue; the possibility of the pre-read data which is not read being read is often higher than that of the data whose write is completed or the read data; the pre-read queue is set as the lowest invalidation priority level such that the pre-read data is protected, and the adaptability of a pre-read scenario is enhanced, in particular the read-write service scenario, and the read and pre-read performance are improved.

Corresponding to the above method embodiment, an embodiment of the present application also provides a pre-read data caching apparatus. The pre-read data caching apparatus described below and the pre-read data caching method described above may be referred to each other.

Figure 3:
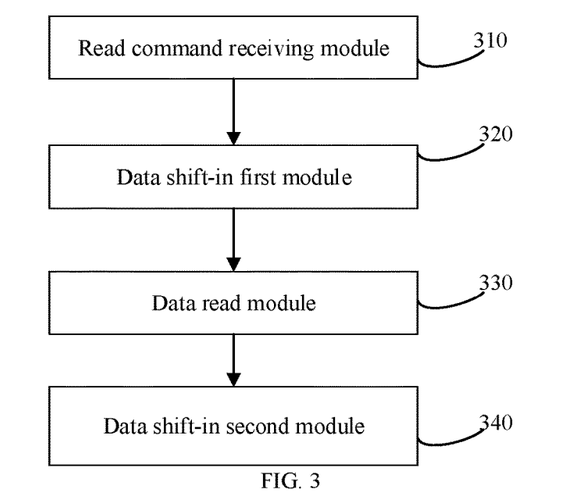
FIG. 3 is a schematic structural diagram of a pre-read data caching apparatus in an embodiment of the present application.

Referring to FIG. 3, the apparatus may include the following modules:

a read command receiving module 310 configured for receiving a read command for a target file;

a data shift-in first module 320 configured for, on the condition that it is determined that there are target pre-read data of the target file in the pre-read queue, moving the target pre-read data from the pre-read queue into the secondary cache queue;

a data read module 330 configured for reading the target pre-read data in the secondary cache queue;

and a data shift-in second module 340 configured for, after the reading is completed, moving the target pre-read data from the secondary cache queue into the reset queue;

wherein the pre-read queue has the lowest invalidation priority level.

With the application of the apparatus provided by an embodiment of the present application, after receiving a read command for a target file, on the condition that determining that there are target pre-read data of the target file in a pre-read queue, the pre-read data are moved from the pre-read queue into a secondary cache queue; the target pre-read data are read in the secondary cache queue; after reading is completed, the target pre-read data are moved from the secondary cache queue into a reset queue, the invalidation priority level of the pre-read queue being the lowest. According to the degree that the data may be read, a multi-level cache is set to protect the validity of the pre-read data, which may improve the overall pre-read efficiency and read performance.

In a specific implementation mode of the present application, a data shift-in third module is further included for:

after receiving a read command for a target file, in the case where the reading is not completed, moving the target pre-read data in the pre-read queue and/or the secondary cache queue into the reset queue on the condition that it is monitored that the target file is closed.

In a specific implementation mode of the present application, a data shift-in fourth module is further included for:

after moving the target pre-read data from the secondary cache queue into the reset queue, in the case where the target pre-read data is read and a write operation is to be performed on the target pre-read data, moving the target pre-read data from the reset queue into the write queue.

In a specific implementation mode of the present application, a data aging module is further included for:

when it is monitored that the used cache space exceeds the set space threshold value, aging the data in the reset queue, the secondary cache queue, and the pre-read queue according to the preset invalidation priority level sequence.

In a specific implementation mode of the present application, the sequence of the invalidation priority level from high to low is successively: the reset queue, the secondary cache queue, and the pre-read queue.

In a specific implementation mode of the present application, a data age processing module is used for:

aging each of the data in the reset queue in turn;

in the process of aging the data in the reset queue, on the condition that the used cache space is less than or equal to the space threshold value, stopping the aging operation;

otherwise, after aging all the data in the reset queue, aging each of the data in the secondary cache queue in turn;

in the process of aging the data in the secondary cache queue, on the condition that the used cache space is less than or equal to the space threshold value, then stopping the aging operation;

otherwise, after aging all the data in the secondary cache queue, aging each of the data in the pre-read queue in turn;

and in a process of aging the data in the pre-read queue, on the condition that the used cache space is less than or equal to the cache threshold value, stopping the aging operation.

In a specific implementation mode of the present application, a data age processing module is used for:

aging each of the data in the reset queue in turn according to the popularity from low to high;

and/or, aging each of the data in the secondary cache queue according to the sequence of the storage duration from long to short;

and/or, aging each of the data in the pre-read queue in turn according to the popularity from low to high.

Corresponding to the above method embodiment, an embodiment of the present application further provides a pre-read data caching device, including:

a memory for storing a computer program;

and a processor for implementing the steps of the above-mentioned pre-read data caching method when executing the computer program.

Figure 4:
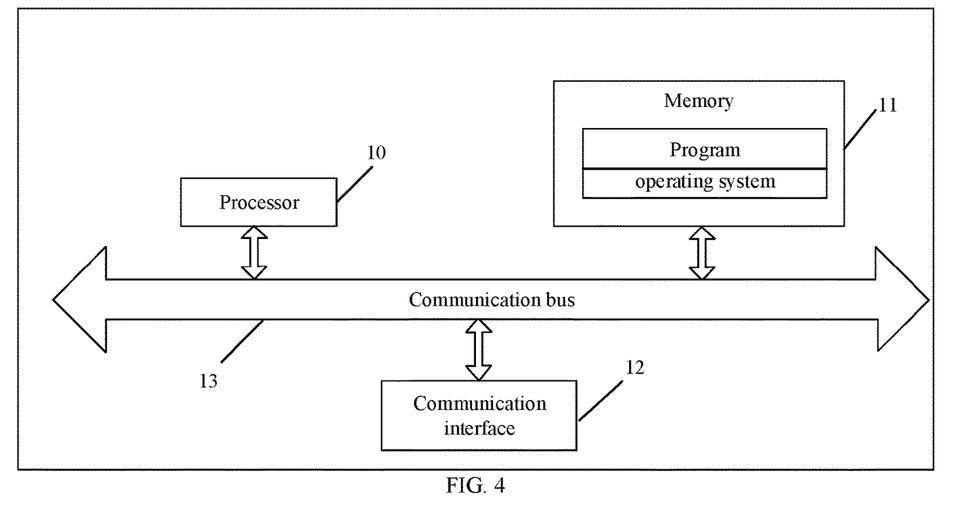
FIG. 4 is a schematic structural diagram of a pre-read data caching device in an embodiment of the present application.

As shown in FIG. 4, a schematic composition structure diagram of a pre-read data caching device is shown. The pre-read data caching device may include a processor 10, a memory 11, a communication interface 12, and a communication bus 13. The processor 10, the memory 11, and the communication interface 12 all communicate with each other via the communication bus 13.

In an embodiment of the present application, the processor 10 may be a central processor (Central Processing Unit, CPU), an application-specific integrated circuit, a digital signal processor, a field programmable gate array, or other programmable logic devices, and so on.

The processor 10 may call a program stored in the memory 11. In particular, the processor 10 may execute operations in the embodiments of the pre-read data caching method.

The memory 11 is used for storing one or more programs, and the programs may include program codes. The program code includes computer operation command; in the embodiment of the present application, the memory 11 stores at least a program for realizing the following functions:

receiving a read command for a target file;

on the condition that determining that there is target pre-read data of the target file in a pre-read queue, then moving the pre-read data from the pre-read queue into a secondary cache queue;

reading the target pre-read data in the secondary cache queue;

and after reading is complete, moving the target pre-read data from the secondary cache queue into a reset queue;

wherein the pre-read queue has the lowest invalidation priority level.

In one possible implementation, the memory 11 may include a storage program area and a storage data area. The storage program area may store an operating system, an application program required by at least one function (such as the file reading function and the queue storage function), etc.; the storage data area may store data created during the use, such as priority data, read status data, and so on.

In addition, the memory 11 may include high-speed random access memory and may also include non-volatile memory, such as at least one magnetic disk storage device or other volatile solid-state storage devices.

The communication interface 12 may be an interface for a communication module for connecting to other devices or systems.

Of course, it needs to be noted that the structure shown in FIG. 4 does not constitute a limitation of the pre-read data caching device in the embodiment of the present application, and the pre-read data caching device may include more or fewer components than those shown in FIG. 4 or combine with some components in practical applications.

Corresponding to the above method embodiments, an embodiment of the present application further provides a computer-readable storage medium having stored thereon a computer program which when executed by a processor implements the steps of the above-mentioned pre-read data caching method.

Various embodiments are described in the description in a progressive manner with each embodiment focusing on differences from other embodiments. The same or similar parts of each embodiment may be referred to each other.

Professionals can further realize that the units and algorithm steps of each example described in combination with the embodiments disclosed herein can be implemented in electronic hardware, computer software, or a combination of the two. In order to clearly explain the interchangeability of hardware and software, the composition and steps of each example have been generally described in the above description according to the functions. Whether these functions are implemented in hardware or software depends on the specific application and design constraints of the technical solutions. Professionals and technicians can use different methods for each specific application to realize the described functions, but such implementation should not be considered beyond the scope of the application.

The steps of a method or an algorithm described in connection with the embodiments disclosed herein may be embodied directly in hardware, in a software module executed by a processor, or in a combination of the two. The software module can be placed in a random memory (RAM), internal storage, read-only memory (ROM), an electrically programmable ROM, an electrically erasable programmable ROM, a register, a hard disk, a removable disk, a CD-ROM, or any other forms of storage medium known in the technical field.

The principles and implementation modes of the present application have been described herein with reference to specific examples, and the description of the above embodiments is intended only to facilitate the understanding of the technical solutions of the present application and its core concepts. It should be pointed out that for ordinary technicians in the technical field, without departing from the principles of the present application, several improvements and modifications can be made to the present application and such improvements and modifications also fall within the protection scope of the claims of the present application.

The invention claimed is:

1. A pre-read data caching method, comprising:
receiving a read command for a target file;
on the condition that determining that there are target pre-read data of the target file in a pre-read queue, moving the pre-read data from the pre-read queue into a secondary cache queue;
reading the target pre-read data in the secondary cache queue; and
after reading is complete, moving the target pre-read data from the secondary cache queue into a reset queue;
wherein an invalidation priority level of the pre-read queue is the lowest.

2. The method according to claim 1, wherein after receiving a read command for a target file, the method further comprises:
in a case where the reading is not completed, moving the target pre-read data in the pre-read queue and/or the secondary cache queue into the reset queue on the condition that it is monitored that the target file is closed.

3. The method according to claim 1, wherein after moving the target pre-read data from the secondary cache queue into a reset queue, the method further comprises:
in a case where the target pre-read data is read and a write operation is to be performed on the target pre-read data, moving the target pre-read data from the reset queue into a write queue.

4. The method according to claim 1, further comprising:
in a case where it is monitored that used cache space exceeds a set space threshold value, aging data in the reset queue, the secondary cache queue, and the pre-read queue according to a preset invalidation priority level sequence.

5. The method according to claim 4, wherein the invalidation priority level sequence from high to low is successively: the reset queue, the secondary cache queue, and the pre-read queue.

6. The method according to claim 5, wherein aging data in the reset queue, the secondary cache queue, and the pre-read queue according to a preset invalidation priority level sequence comprises:
aging each of the data in the reset queue in turn;
in a process of aging the data in the reset queue, on the condition that the used cache space is less than or equal to the space threshold value, stopping aging operation;
otherwise, after aging all the data in the reset queue, aging each of the data in the secondary cache queue in turn;
in a process of aging the data in the secondary cache queue, on the condition that the used cache space is less than or equal to the space threshold value, stopping the aging operation;
otherwise, after aging all the data in the secondary cache queue, aging each of the data in the pre-read queue in turn;
and in a process of aging the data in the pre-read queue, on the condition that the used cache space is less than or equal to the cache threshold value, stopping the aging operation.

7. The method according to claim 6, wherein aging each of the data in the reset queue in turn comprises:
aging each of the data in the reset queue in turn according to a popularity sequence from low to high;
and/or,
aging each of the data in the secondary cache queue in turn comprises:
aging each of the data in the secondary cache queue in turn according to a sequence of a storage duration from long to short;
and/or,
aging each of the data in the pre-read queue in turn comprises:
aging each of the data in the pre-read queue in turn according to the popularity sequence from low to high.

8. The method according to claim 1, wherein the method further comprises:
when it is determined that the target file is to be pre-read, on the condition that the target pre-read data for the target file is in the reset queue, moving the target pre-read data in the reset queue into the pre-read queue.

9. The method according to claim 4, wherein an aging processing is performed by using a trim principle.

10. The method according to claim 7, wherein the popularity of the data is determined according to a number of times the data is accessed, a distance between an accessed time and a current time.

11. A pre-read data caching device, comprising:
a memory for storing a computer program;
and a processor for implementing operations comprising:
receiving a read command for a target file;
on the condition that determining that there are target pre-read data of the target file in a pre-read queue, moving the pre-read data from the pre-read queue into a secondary cache queue;
reading the target pre-read data in the secondary cache queue; and
after reading is complete, moving the target pre-read data from the secondary cache queue into a reset queue;
wherein an invalidation priority level of the pre-read queue is the lowest.

12. The pre-read data caching device according to claim 11, wherein after receiving a read command for a target file, the operations further comprise:
in a case where the reading is not completed, moving the target pre-read data in the pre-read queue and/or the secondary cache queue into the reset queue on the condition that it is monitored that the target file is closed.

13. The pre-read data caching device according to claim 11, wherein after moving the target pre-read data from the secondary cache queue into a reset queue, the operations further comprise:
in a case where the target pre-read data is read and a write operation is to be performed on the target pre-read data, moving the target pre-read data from the reset queue into a write queue.

14. The pre-read data caching device according to claim 11, further comprising:
in a case where it is monitored that used cache space exceeds a set space threshold value, aging data in the reset queue, the secondary cache queue, and the pre-read queue according to a preset invalidation priority level sequence.

15. The pre-read data caching device according to claim 14, wherein the invalidation priority level sequence from high to low is successively: the reset queue, the secondary cache queue, and the pre-read queue.

16. The pre-read data caching device according to claim 15, wherein aging data in the reset queue, the secondary cache queue, and the pre-read queue according to a preset invalidation priority level sequence comprises:
   aging each of the data in the reset queue in turn;
   in a process of aging the data in the reset queue, on the condition that the used cache space is less than or equal to the space threshold value, stopping aging operation;
   otherwise, after aging all the data in the reset queue, aging each of the data in the secondary cache queue in turn;
   in a process of aging the data in the secondary cache queue, on the condition that the used cache space is less than or equal to the space threshold value, stopping the aging operation;
   otherwise, after aging all the data in the secondary cache queue, aging each of the data in the pre-read queue in turn;
   and in a process of aging the data in the pre-read queue, on the condition that the used cache space is less than or equal to the cache threshold value, stopping the aging operation.

17. The pre-read data caching device according to claim 16, wherein aging each of the data in the reset queue in turn comprises:
   aging each of the data in the reset queue in turn according to a popularity sequence from low to high.

18. The pre-read data caching device according to claim 16, wherein aging each of the data in the secondary cache queue in turn comprises:
   aging each of the data in the secondary cache queue in turn according to a sequence of a storage duration from long to short.

19. The pre-read data caching device according to claim 16, wherein aging each of the data in the pre-read queue in turn comprises:
   aging each of the data in the pre-read queue in turn according to the popularity sequence from low to high.

20. A computer-readable storage medium, having stored a computer program thereon, when the computer program executed by a processor, implementing operations comprising:
   receiving a read command for a target file;
   on the condition that determining that there are target pre-read data of the target file in a pre-read queue, moving the pre-read data from the pre-read queue into a secondary cache queue;
   reading the target pre-read data in the secondary cache queue; and
   after reading is complete, moving the target pre-read data from the secondary cache queue into a reset queue;
   wherein an invalidation priority level of the pre-read queue is the lowest.

* * * * *